Oct. 21, 1952  J. TREFIL  2,614,792
VALVE GUIDE MEANS
Filed Aug. 22, 1946  2 SHEETS—SHEET 1
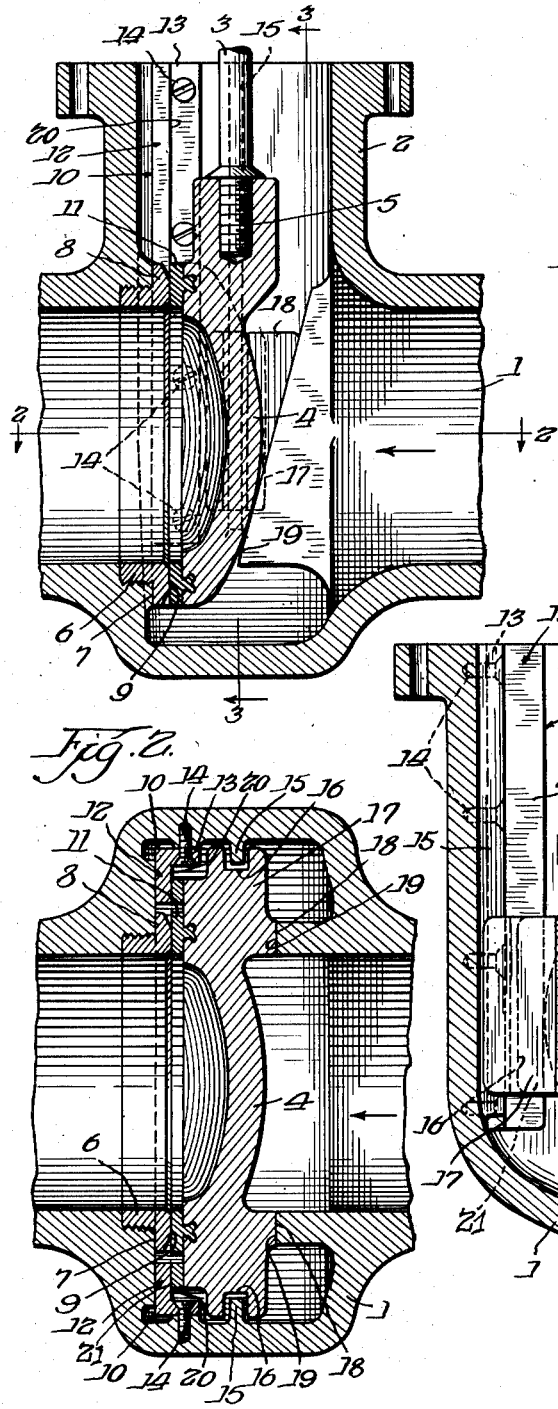
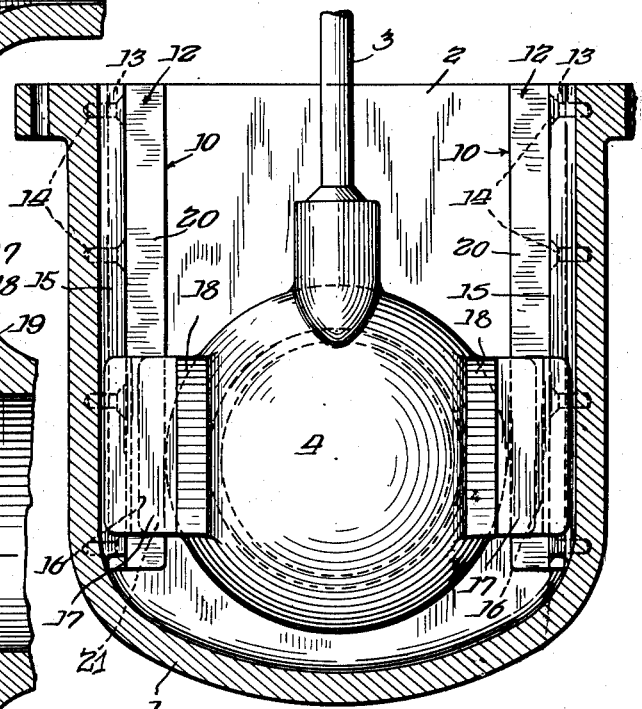
Inventor:
James Trefil:
By Joseph O. Lange
Atty.

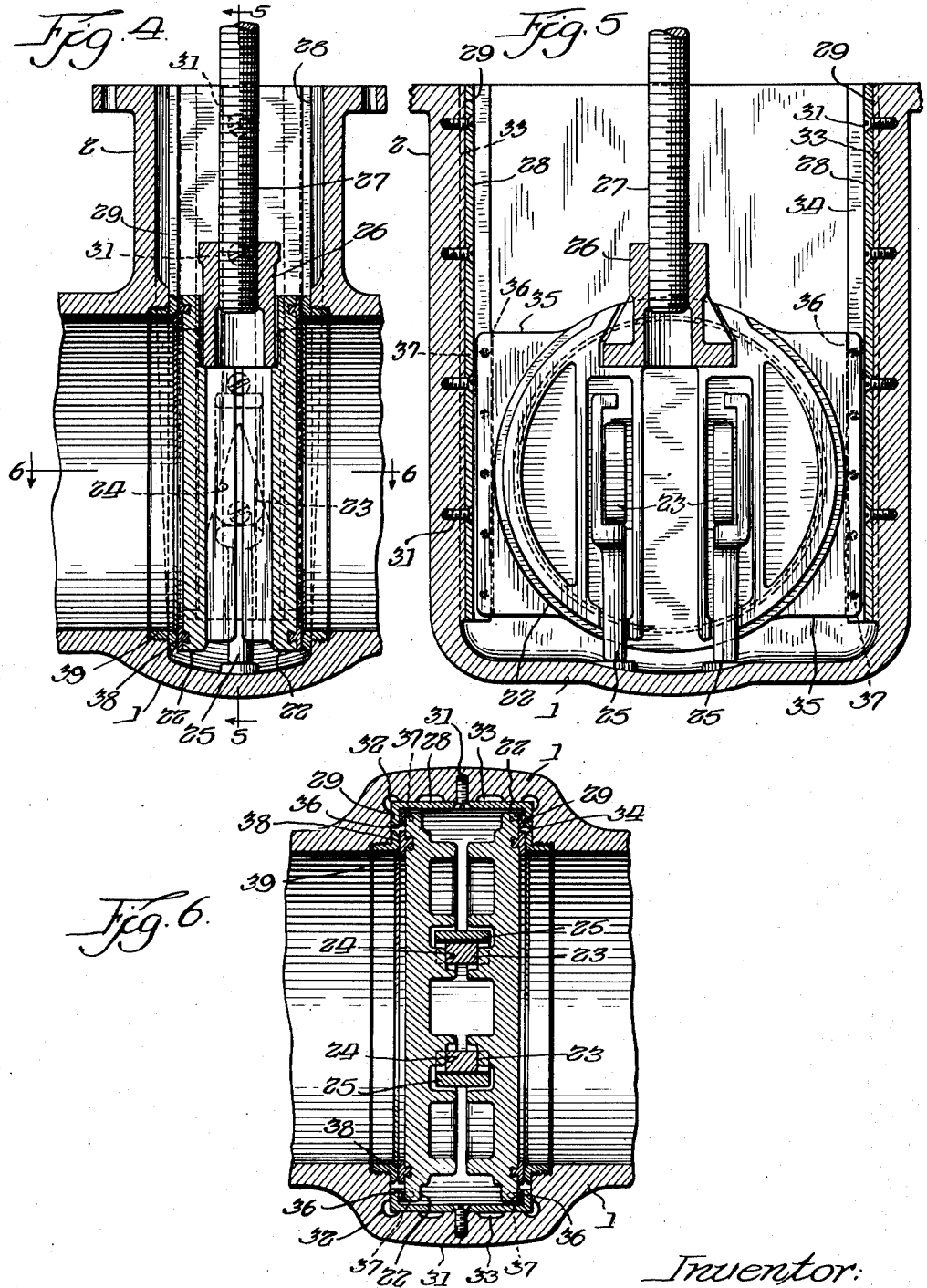

Patented Oct. 21, 1952

2,614,792

UNITED STATES PATENT OFFICE 2,614,792

VALVE GUIDE MEANS

James Trefil, Berwyn, Ill., assignor to Crane Co., Chicago, Ill., a corporation of Illinois Application August 22, 1946, Serial No. 692,209

4 Claims. (Cl. 251—55)

This invention relates to valve guide means and more particularly it pertains to a construction in which a gate valve disc or closure member is fully guided for substantially the entire travel of the valve in the opening and closing operations.

While it is true that normally gate valves are not used for throttling purposes, there are some emergency instances for example in which the use of a valve for such service may be desirable. In such cases there must be a sufficient guide surface provided to stand the high transverse loads occasioned by the flow of fluids at relatively high velocities against and past the closure member while in such throttle position as well as during the course of operation. For example on wash-water lines, valves are used in a throttle position and a spouting velocity and the ordinary valves will not function properly and a fully guided valve disc construction is desirable if proper performance is to be assured and the present round bottom valves are not suitable for such severe service. Heretofore there have been valve constructions available in which there has been additional guide surface for the closure member, but these constructions have been objectionable because they have located the additional guide surface in the stream flow of the valve and thereby caused pressure drop which is obviously objectionable in such installations.

Therefore it is one of the more important objects of this invention to provide a valve construction in which such provision for the additional guide surface for the closure member is obtained without encroachment into the flow line of the valve and thereby avoiding objectionable pressure drop.

Another important object is to provide a construction which is relatively economical to install as well as convenient to replace or to repair when occasion demands.

A further important object is to provide a construction in which the usual valve body ring seating surface is easily supplemented by an extension to thereby reduce the unit load area of the closure member against the body seat ring when subjected to high velocity flow for example or installed in a vertical line.

Another important object is to provide a construction in which the contact surfaces of the guides as well as those of the body seat ring are in the same plane so that uniform and full guiding for the closure member is thereby provided.

Another important object is to provide an L-shaped channel guide sharing the thrust load of the disc with the body seat ring during the entire course of travel of the disc or closure member thereby eliminating also the highly concentrated load on the seat ring during the throttling or intermediate position of the valve.

A further object is to provide a center U-shaped guide having several surfaces to receive the transverse load on the outer portion of the closure member to thereby supplement the thrust area normally placed upon the body seat ring during the course of opening and closing the valve.

A further object is to provide a construction of the character hereinafter described in greater detail applicable both to a single disc construction as well as to a double disc valve.

Other and equally important objects will become apparent upon proceeding with the specification read in light of the accompanying drawings in which Fig. 1 is a fragmentary vertical sectional assembly view of a gate valve embodying my invention.

Fig. 2 is a fragmentary sectional view taken on the line 2—2 of Fig. 1.

Fig. 3 is a fragmentary sectional view taken on the line 3—3 of Fig. 1.

Fig. 4 is a fragmentary sectional view of a modified form of a double disc gate valve employing my invention.

Fig. 5 is a fragmentary sectional view taken on the line 5—5 of Fig. 4.

Fig. 6 is a fragmentary sectional view taken on the line 6—6 of Fig. 4.

Similar reference characters are used throughout the several views to indicate similar parts or elements.

Referring now to Fig. 1, a gate valve body 1 is shown in fragmentary transverse section and eliminates the conventional connecting ends for attachment to pipe lines by either flanges, screwed connections, welding, brazing or the like. At the upper portion of the valve body as at 2 a conventional body extension is provided for receiving the usual bonnet flange (not shown), the bonnet supporting the valve actuating mechanism for the journaling of the valve stem as shown fragmentarily as at 3 and which is attached to the valve closure member 4 by means of the threads 5. The body or casing 1 is provided with a conventional shouldered type of body seat ring 6 threadedly or otherwise shouldered as indicated at 7 and which may be integral therewith. The innermost face of the shouldered portion 8 forms the surface sealing contact as at 9 for the complementary surface 11. Pressure against the disc on the upstream side is indicated as flowing in a direction shown by the arrow. Thus far the construction described may be said to be conventional to a gate valve.

The important element of the invention lies in the construction which is hereinafter described in providing for a supplementary closure member guide and support as better shown in Fig. 2 which is preferably channeled or of L-formation and consists of the extension 12 which is made accurately of the same thickness as the shouldered portion or annular projection 8 of the body ring. In angular relation to the extension 12 is the other angular portion 13 of the guide which thus serves as a means for attaching the guide or extension to the body by means of the screws 14. The length of the channel strip portion comprising the guide member 10 insofar as its extension into the bonnet portion 2 of the valve is concerned depends on the lift of the valve itself, that is to make the guide 10 long enough to allow substantial guidance of the closure member during the entire travel of the closure member in opening and closing the valve. The closure member 4 aside from the guide 10, is relatively loosely guided insofar as transverse movement is concerned when in the open position by means of the guide ribs 15 fitted within the grooved portion 16. In the closing movement of the valve, positioning the closure member against the surface 9 of the seat ring 6 is effected by means of the oppositely disposed wings 17 having on each an inclined surface 18 for slidable movement upon similarly inclined surface 19 of the casing 1. The wings 18 may be substantially wider than shown depending upon the length of guide desired.

Thus it will be apparent as more clearly shown in Fig. 2 that the contact face 11 on the closure member is not only supported against the surface 9 of the body seat ring but is supplemented by the additional supporting surface provided at 20 by the angular guide 10. It has been clearly demonstrated that in such conditions where throttling service for example is necessary or where the load transversely occasioned by the high velocity flow are common, it is desirable to supplement the body ring seat contact surface with the closure member by additional means tending thereby to reduce the unit load area against the closure member. As shown in Figs. 2 and 3 the hardened facing 21 may be employed to aid in bearing more successfully the transverse loads against the guide 10 and thus save the seat faces 9 and 11 from excessive wear.

Thus far the description of one application of my invention has been confined to a single disc type of valve. However, the invention is also applicable to a valve employing two discs, that is one bearing against the upstream and also against the downstream side of the valve. This construction is shown more clearly in the fragmentary sectional view of Fig. 4 in which a conventional valve body is employed, generally designated 1 which in its longitudinal section is similar to that shown on page 120 of Crane Co.'s Catalog No. 41, and is known to the trade as a "double disc gate valve." The manner in which the pair of discs 22 are held together or tied in with the stem is similar to that shown in the construction referred to in the catalog. It is deemed to be unnecessary to give a more detailed description and showing of the actuating mechanism, since the latter is conventional in this type of valve design. A principal reason for showing the double disc valve construction in Figs. 4 to 6 inclusive is to merely demonstrate that a U-shaped guide insofar as transverse sections are concerned may be conveniently employed.

Referring now in detail to the double disc gate valve construction shown in Figs. 4 to 6 inclusive previously referred to, a conventional gate valve body is shown which is generally designated 1, with the usual bonnet connection 2, and having the wedges 23 therebetween bearing against the tapered surfaces 24. The wedges are supported from the lower portion by means of the hooks 25 which are more clearly shown in Fig. 5. Thus it will be apparent that as the discs 22 are moved downwardly within the valve body 1, they tend to spread upon contact with the wedge member 23 to move upon the inclined surfaces thereof 24 to thereby provide a tight valve. The actuating mechanism for the discs is conventional in that it comprises a disc nut 26 within which the threaded stem 27 is movable to allow for the disc to move upwardly or downwardly to open or close the valve respectively depending upon the rotation of the stem. Thus far this description deals with a valve structure which is conventional. However, directing attention now to Fig. 6, a guide 28 angular in cross-section is fitted snugly between the surfaces 29 and is held against axial movement by means of the screws 31. It may be of U-cross section or with two L-channel sections. As shown more clearly in Fig. 5, the angular guides 28 preferably extend for substantially the full length of the travel of the disc, that is from the closed to the fully open position of the valve. In order to allow for the proper fitting of the angular guide member 28 the body may be recessed as indicated at 32 and 33 to allow for a supported bearing of each disc guide against the transverse loads created by line pressure.

It may be desirable under certain conditions to provide the guide contact strips 36 on the wings 35 to bear against the transverse surface 34 of the angular guide 28. Any suitable means of attachment may be used to attach the strips 36 to the disc guide wings 35, as for example, by means of the screws 37. The special facing described provides for increased resistance against abrasion and to some extent reduces the objectionable effects of corrosion upon the sliding members.

The thickness of the facing 36 of course should be equal to and no greater than the thickness of the seat ring 38 contacting with the seat ring 39. Otherwise it would tend to cause the valve seat ring 38 to assume the entire load without benefit of the desirable support obtained by the supplemental facing 36 bearing against the surface 34 of the guide member 28. Thus the member 36 serves as an additional supporting means for the discs in helping to retain the latter and to support them against the relatively large pressure loads placed upon them during the course of service, depending upon the extent of pressure and the direction of flow as well as the position of the pipe line itself.

In both types of valve constructions it will be noted that separate seat facings have been indicated. It is of course obvious that the latter facing 36 may be made integral with the valve disc or closure member in each case without changing in any respect the substance of this invention. The ribbing on the rear side of the disc 22 and which is designated 26 is of such configuration as to accommodate the necessary connections such as that previously referred to in the catalog between the closure member and the stem. Of course the detailed manner of providing such construction insofar as the disc and stem connection is concerned may vary substantially depending upon the size and the type of valve as well as the service for which it is suitable. It should of course therefore be apparent that the hereinabove described invention is capable of being applied in numerous forms and therefore it is the desire to be limited only by the scope of the appended claims.

I claim:

1. Valve guiding means within a casing, the combination including a closure member therefor, an annular shouldered seating member for the said closure member transversely mounted within the said casing, an angular or L-form of elongated strip guide means substantially vertically mounted within corner portions of a chamber in the said casing in planes substantially transverse to the direction of flow through the said casing, the shouldered portion on the said first-named seating member providing for the seating engagement by the said closure member, the said angular strip guide means including an unyielding extension inwardly turned of substantially the same thickness and positioned in the same plane as the shouldered portion of the said first-named seating member, the unyielding inturned extension of the guide means being supported by said corner portions of the said casing in an abutting contact therewith for substantially the full length of the strip, the contact surface of the said closure member with the said first-named seating member in the closed position of the valve being supplemented by its contact at an outer peripheral portion with the said unyielding inturned extension portion of the angular guide means having the same thickness as the shouldered portion of the said annular seating member.

2. A guide in a valve housing, the combination comprising a closure member transversely mounted within said housing and reciprocably movable relative thereto, seating means for the said closure member including a shouldered portion for contact with the said closure member, strip form angular guide means of L-shape positioned vertically in oppositely disposed relation within corner portions of the housing and in abutting relation thereto adjacent to the said seating means, the guide means including an unyielding extension portion supported directly by the housing substantially in the same plane and having the same thickness as the shouldered portion of the said seating means, closure member seating means provided by the said housing and including transverse inclined surfaces cooperating with the said closure member for positively holding the said closure member in contact with the said seating means and also with the unyielding housing supported portion of the said angular guide means during the closed position of the valve, the said transverse inclined surfaces projecting from spaced-apart opposite sides of the housing in vertical planes substantially defined by the diameter of the shouldered portion of the said seating means.

3. Valve guiding means of the class described, the combination including a housing with a valve chamber and a reciprocably movable closure member therewithin with a plain seating surface, the housing having an annular seating portion for the said closure member, the guide means including an angular form of elongated strip means mounted in abutting relation in oppositely disposed corner portions on side walls of the chamber within the said housing for guiding said closure member on its outer periphery in a plane complementary to the closure seating surface, annular surface means on the said seating portion of the said housing for engagement by the said closure member, the said strip means having a transverse unyielding inturned extension of substantially the same thickness as the seating portion of the said housing and extending in substantially the same plane, the contact surface of the said closure member with the said seating portion of the housing being supplemented by contact of the closure member with the transverse unyielding extension of the said strip member, the said housing supporting said strip means on its outer surfaces adjoining the housing for substantially the length of the strip means.

4. Guide means within a casing having a chamber for receiving a reciprocably movable closure member, the combination including said closure member, the casing having an annular seating member with a shouldered portion for providing an abutting contact with the said closure member, the said closure member having side extension portions, the guide means including an angular form of elongated strip mounted within corner limits of the chamber within the said casing, a portion of the elongated strip being engageable by the side extension portions of the closure member simultaneous with the engagement by the said closure member of the casing shouldered portion, the said angular form strip having an integral extension of substantially the same thickness as the shouldered portion of the said first-named seating member for sliding engagement by the said extension portions of the closure member, the latter contact surface of the angular guide extension being in substantially the same plane as the closure member contact surface of the projecting portion of the annular seating member, the angular guide strip being supported by the said casing for substantially its full length in oppositely disposed intersecting planes.

JAMES TREFIL.

REFERENCES CITED

The following references are of record in the file of this patent:

UNITED STATES PATENTS

| Number | Name | Date |
| --- | --- | --- |
| 838,509 | O'Brien | Dec. 11, 1906 |
| 1,189,086 | Freeman | June 27, 1916 |
| 1,482,836 | Brubaker | Feb. 5, 1924 |
| 1,826,941 | La Mont | Oct. 13, 1931 |
| 1,830,999 | Harwood | Nov. 10, 1931 |
| 1,832,748 | Starke | Nov. 17, 1931 |
| 1,999,921 | Burkhardt | Apr. 30, 1935 |
| 2,114,934 | Nordstrom | Apr. 19, 1938 |
| 2,151,596 | Halle | Mar. 21, 1939 |
| 2,230,600 | Olson | Feb. 4, 1941 |

FOREIGN PATENTS

| Number | Country | Date |
| --- | --- | --- |
| 6,118 | Great Britain | of 1911 |
| 218,040 | Great Britain | of 1924 |
| 505,535 | Germany | of 1930 |